United States Patent Office 2,731,327
Patented Jan. 17, 1956

2,731,327

HYDROMETALLURGICAL TREATMENT OF TITANIFEROUS IRON MATERIAL

William W. Anderson, Metuchen, and Lancelot W. Rowe, Raritan Township, Section Fords, Middlesex County, N. J., assignors to National Lead Company, New York, N. Y., a corporation of New Jersey No Drawing. Application May 3, 1954,
Serial No. 427,395

8 Claims. (Cl. 23—202)

The present invention relates to improvements in the method for treating titaniferous iron material. More particularly it is concerned with preparing a substantially iron-free titaniferous pigment material from titaniferous iron material.

Practically all of the presently known titanium-bearing raw materials occur as titaniferous materials containing iron compounds in varying proportions and forms, and the presently available methods of isolating the titanium values therefrom are costly and not wholly satisfactory. Many processes have been suggested by which a titaniferous concentrate high in titanium dioxide may be recovered from titaniferous ores or other titanium sources.

In the present day titanium dioxide industry only one method of extracting pigment grade titanium dioxide from titaniferous iron materials has been commercially developed. This is the dissolution of titaniferous iron materials in highly concentrated sulfuric acid wherein large quantities of scrap iron are usually employed to reduce substantially all of the ferric iron values in the solution prior to treating the solution to obtain a titanium compound therefrom.

Also, it has been suggested to reduce the iron content of the ore to metallic iron, separate the metallic iron from the titanium values, and then dissolve the remaining titanium values in acid.

Still another method has been proposed by which, under prescribed condition of temperature and pressure, titanium ores are leached in the presence of sulfuric acid to produce soluble titanium values.

All of these procedures impose various difficulties and disadvantages. In the first instance it is found that large quantities of acid-consuming scrap iron are employed to reduce ferric iron values in the digest solution to ferrous iron values prior to precipitation of the titanium values in the solution. Additionally, this method can only be used in connection with large, expensive and permanent installations. Even so, this type of operation has resulted in setting the standard which must be met in the production of commercial grade titanium dioxide.

In practically every instance where the process is based upon separation of iron in the metallic state from the titanium, it is desirable to employ temperatures of approximately 1000° C. and higher. Further, these processes require the addition of agents to aid in the separation of metallic iron and titanium values. Therefore, such processes are greatly restricted since it is usually found that the titanium compounds originally present in the titaniferous iron material are altered to the degree they may become truly insoluble in sulfuric acid.

Methods for preparing titanium dioxide by leaching titaniferous materials have failed in that they cannot produce a titanium dioxide material with the requisite degree of selective iron removal. These methods have not made adequate provision either for elimination of iron or separation and recovery of the titanium values. The latter, in itself, is a serious disadvantage since by prior art methods the quantity of titanium lost with the iron may deleteriously influence the economics of the processes.

An object of the present invention therefore is to provide a simple and improved method for the treatment of titaniferous iron materials.

Another object is to provide a method for treating titaniferous iron material, in which the proportions of iron and titanium vary, to produce a substantially iron-free titanium product.

Still another object is to provide a method for separating the iron content in a titaniferous iron material from the titanium content therein.

A further object of the invention is to provide an improved method of separating the iron content from a titaniferous iron material in an economical and simple operation which insures production of a substantially iron-free titanium material on a commercial scale.

A still further object is to provide a method for producing pigmentary grade titanium dioxide.

These and other objects will become apparent from the following more complete description of the invention.

In its broadest aspects the invention contemplates a method for preparing in a single stage operation a substantially iron-free titanium dioxide material by reacting under pressure a titaniferous iron material, reducing agent, sulfuric acid, and a small amount of an organic flotation agent for sufficient time to produce soluble iron values and insoluble titanium values. Thereafter the iron in solution is readily separated from the insoluble titanium dioxide material. The immediate success of the present invention may be attributed to the discovery of treating a titaniferous iron material in the presence of a small amount of an organic flotation agent while carrying out the reaction at pressures between from about 500 p. s. i. to about 2000 p. s. i. to obtain a white titanium product containing less than about 0.5% iron. Further the white pigmentary material is characterized by having a majority of its particles in the size range of from about 0.2 to about 1 micron. It is worthy of note that, prior to the instant invention, attempts to beneficiate titaniferous iron material by leaching the titaniferous material with a carbonaceous reducing agent and consecrated sulfuric acid were not successful for the production of a white titanium dioxide pigment.

As used herein, the term "directly convert" shall be understood to mean that the instant process is characterized by a single stage conversion of the titanium values in the ore to substantially iron-free, relatively insoluble hydrated titanium dioxide without employing a separate hydrolysis step. By the method of the instant single stage conversion it will be found that the titanium values in the titaniferous iron material are not converted to soluble titanium sulfate since the titanium values will not remain in solution under the conditions of temperature and pressure at which the process is carried out. Insoluble titanium values are directly obtained by pressure treating in the presence of the dilute acid, and it is not necessary to resort to hydrolysis of the titanium values.

The term "titaniferous iron material," as used herein, shall be understood to include titaniferous iron ores and like materials, such as ores which have been chemically or physically treated to produce titaniferous concentrates, slags and similar titanium products containing iron.

To initiate the process of the present invention, titaniferous iron material, such as ilmenite, having a particle size preferably less than about 200 mesh is mixed with sulfuric acid, reducing agent, and an organic flotation agent under the conditions hereafter set forth. The mass is then heated in a pressure vessel, such as an autoclave, for sufficient length of time and under pressure of from about 500 p. s. i. to about 2000 p. s. i. to solubilize all of the iron values present in the titaniferous feed material. Iron removal is greatly enhanced by having a small amount of an organic flotation agent present while leaching in the range of elevated pressures shown. Within the range of pressure at which it has been found desirable to operate it has been observed that substantially no more than 95% iron may be removed without the presence of a flotation agent during leaching, and it is obvious that iron solubilization and removal is very incomplete and considerable contamination of the insoluble titanium product results. However, according to the method of the instant invention, substantially complete iron removal (>99%) is realized without substantial loss of titanium values, such complete iron removal being necessary to obtain a white product.

It is postulated that the process of reacting a mixture of titaniferous iron material, sulfuric acid and reducing material in combination with an organic flotation agent and under pressure of from about 500 p. s. i. to about 2000 p. s. i. attains its high measure of success in that all of the iron in the titaniferous iron material is converted to a soluble ferrous state. In this connection it has been discovered that the use of a small selective amount of an organic flotation agent and reacting the constituents at high pressure materially aids in the formation of a titanium pigment material which is substantially free of iron values. While the exact function of the flotation agent during the leaching operation is not known, it is believed that the flotation agent either serves to disperse the reacting slurry, thereby exposing more surface area of the solid particles for reaction; or the flotation agent breaks down to aid in the reduction of ferric iron to ferrous iron.

In the development of modern flotation systems, the reagents used may be classified under three general headings according to their function, namely: frothing agents, collecting agents and modifying agents. However, for the purpose of the instant invention, it has been found that organic flotation agents which can be used fall into each of the three above classes, and all organic flotation agents employed have been found to work with an equal degree of success. For example, any well known flotation agent such as oleic acid, pine oil, fuel oil, nonanoic acid, or terpineol may be employed to effect ultimate recovery of an iron-free titanium product. For the purpose of this invention, therefore, organic flotation agents may be employed which are classified under the general heading of (1) frothing agents, (2) collecting agents and (3) modifying agents according to the Textbook of Ore Dressing by Richards and Locke, 3rd ed., McGraw-Hill Book Co., Inc., 1940.

It will be seen that essentially all of the iron in an ore may be eliminated, leaving a titanium product which can be utilized as white pigment. The use of an organic flotation agent is of considerable importance, particularly in obtaining efficient dissolution of the iron without solubilization of the titanium values. In general it is preferable to add from about 0.01% to about 0.1% by weight of organic flotation agent. Larger quantities may cause excessive foaming and organic flotation agent in excess of 0.5% does not additionally aid in the dissolution of the iron and may unnecessarily increase the cost of the operation.

The range of reducing agent concentration necessary to secure removal of iron is dependent upon the amount of ferric iron in the titaniferous material to be treated. In general, and as shown supra, it is only necessary to add reducing agent in sufficient amount to reduce the ferric content of the titaniferous material to ferrous iron, all of the ferrous iron then present being readily solubilized by reaction with the sulfuric acid present during leaching. Any carbonaceous reducing agent such as carbon, coke or the like may be added in amount from 2% to 4% by weight of the titaniferous iron material to be treated. Further, it has been found that sulfur dioxide in amount up to about 2% of the titaniferous material and employed in conjunction with the amount of carbonaceous reducing agent above stated, aids in some degree in producing an iron-free titanium concentrate. Sulfur dioxide used alone, or carbon used alone, does not permit quite as complete iron removal as when these two reducing agents are used in combination under the conditions stated. Of course it is to be appreciated that the amount of reducing agent employed may be changed by the presence or absence of oxidizing agents, other than those already mentioned. Excess quantities of reducing materials may be employed, but they may cause a corresponding increase in the required amount of sulfuric acid and consequently it is preferred to avoid such a procedure.

In order to realize the most efficient results, leaching should be carried out at pressures of from about 500 p. s. i. to about 2000 p. s. i. In general, the use of high pressure, that is, above 2000 p. s. i. is to be avoided since obvious disadvantages result. At pressures above 2000 p. s. i., the water present during leaching may begin to convert to steam, and thereby acid concentration will increase such that greater solubilization of the titanium values begins to take place. Further some of the iron which has already gone into solution may precipitate out and remain behind to contaminate the $TiO_2$ product when pressure is removed from the system. Also the problem of materials of construction and size of apparatus becomes unduly magnified when excessively high pressures are used.

In order to achieve the operating pressures according to the process of the instant invention, it is only necessary to heat the pressure vessel at which the reaction takes place to temperatures between about 250° C. and 335° C. This temperature range permits maximum iron removal with minimum loss of titanium values and a minimum period of leaching, and gives reaction pressures within the range 500–2000 p. s. i.

The optium amount of sulfuric acid required to obtain maximum iron removal with minimum loss of titanium varies with the composition of titaniferous iron materials to be treated, in much the same manner as the quantity of coke to be employed for reduction of ferric iron to ferrous iron. Obviously sufficient sulfuric acid should be present during leaching to at least theoretically react with all the ferrous iron present after reduction of the ferric content of the titaniferous iron material to ferrous values. Thus, with a greater amount of total iron content in the material, it will be necessary to proportionately increase the amount of sulfuric acid employed. For example, a titaniferous iron material such as an ilmenite-magnetite ore containing 43% iron (calculated on FeO basis) requires about 60 parts of $H_2SO_4$ per 100 parts of ore whereas ilmenite containing only 32% iron (calculated on FeO basis) requires only about 44 parts $H_2SO_4$ per 100 parts of ilmenite.

In subjecting a titaniferous iron material to the action of sulfuric acid, however, it is preferred to have excess sulfuric acid solution present to provide a workable slurry during reaction and after reaction so that the reaction mass may be easily removed from the pressure vessel and filtered. To this end it is preferred to add from 25% to 100% excess acid over that theoretically required to react with all of the ferrous iron values, since the excess acid permits obtention of a slurry of the leached mass as distinguished from a cake-like reaction mass, the latter being undesirable in carrying out the actual mechanics of the process.

The sulfuric acid employed should not be highly concentrated and it has been found desirable to add sulfuric acid solution containing from about 20% to about 50% $H_2SO_4$. When an acid solution containing greater than 50% $H_2SO_4$ is employed it will be found that greater solubilization of the titanium values present takes place with attendant decrease of titanium recovery. Further, increased acid concentration above 50% $H_2SO_4$ results in less iron removal and the titanium concentrate sets up into a solid, cake-like mass, unless of course a great excess amount of acid solution is employed to maintain a workable slurry. While it is true that sulfuric acid concentration greater than 50% $H_2SO_4$ may be used, it is to be seen where it can be highly disadvantageous to employ such high acid concentrations. Obviously, an acid concentration of less than 20% $H_2SO_4$ may be employed (for example, as low as about a 6% $H_2SO_4$ solution), especially where a titaniferous iron material is relatively low in total iron content. However, when a large amount of iron is present, it becomes necessary to employ large quantities of acid solution containing less than 20% $H_2SO_4$ in order to have sufficient sulfuric acid present to react with all of the ferrous iron values. This is undesirable from the standpoint of equipment size and ordinarily is to be avoided in a commercial scale operation.

In the practice of the invention, the titaniferous iron materials contemplated as sources of titanium generally contain substantial amounts of iron in the ferric condition, such as, for example ilmenite and ilmenite-magnetite ores or concentrates thereof. Nevertheless, it will also be found that the leaching method may be employed with equal success upon other titaniferous materials such as, leucoxenes, bauxite residues and the like. For the purpose of producing a titaniferous pigment material, the titaniferous iron material should be of a particle size not larger than about 40 mesh. Particle sizes larger than 40 mesh do not permit complete iron removal, though iron removal from the coarser particle size material can be improved by prolonged periods of treatment. As is to be expected, therefore, iron values are more readily and completely solubilized as the particle size of the feed material decreases. For example, an ilmenite ground to 100% minus 40 mesh produced a titanium dioxide concentrate containing 3.7% iron, whereas the same ilmenite ground to 100% minus 200 mesh and treated under similar conditions produced a titanium dioxide concentrate containing only 0.4% Fe.

By way of further illustrating the invention, the following examples are given:

Example I 1000 parts of a minus 200 mesh flotation ilmenite containing 0.5 part oleic acid and having an analysis of 46% $TiO_2$, 40% FeO and 4.5% $Fe_2O_3$ was admixed with 4600 parts of a 23% sulfuric acid solution and 20 parts carbon to produce a slurry. This slurry was added to an autoclave and subjected to a pressure of 2000 p. s. i. for a period of 30 minutes. Simultaneously, 20 parts of $SO_2$ gas were introduced into the autoclave during the reaction period. During the reaction period, the slurry was agitated to provide a high degree of contact between the ore particles and other reactants. The reacted slurry mass was then removed from the autoclave, filtered and washed to remove the solubilized constituents, especially iron. The hydrated $TiO_2$ residue, after drying and weighing, was found to contain 92.7% $TiO_2$ and only 0.4% total iron. The iron removal was therefore calculated to be 99.0% and the titanium loss by solubilization was substantially less than 1%. The $TiO_2$ product, after treatment, possessed the essential properties of a white, commercial-grade pigment.

Example II 1000 parts of the flotation ilmenite used in Example I was treated in the same manner as described in Example I except that a 50% $H_2SO_4$ solution was employed. The slurry then was heated in the autoclave to a pressure of 500 p. s. i. for a period of 30 minutes. After the solubilized iron values were filtered off and the hydrated $TiO_2$ residue was washed and dried, the residue was analyzed and found to contain 92.0% $TiO_2$ and only 0.38% total iron. The iron removal, therefore, was calculated to be 99.4% and the titanium loss was only about 1%. As in the previous example, the $TiO_2$ product possessed the requisite properties of a white, commercial-grade pigment.

Example III

To 1000 parts of an ilmenite beach sand of minus 200 mesh particle size and analyzed as containing 60% $TiO_2$, 25.5% $Fe_2O_3$ and 9% FeO was added 2200 parts of a 50% $H_2SO_4$ solution, 40 parts carbon and 1 part nonanoic acid. The slurry mixture was then heated in an autoclave to a pressure of about 1000 p. s. i. for a period of 30 minutes, and simultaneously 20 parts of $SO_2$ gas were introduced during this period. The reacted mass was then removed from the autoclave, filtered and washed to remove the solubilized iron values. The hydrated $TiO_2$ residue was dried, weighed, analyzed and found to contain 94.8% $TiO_2$ and 0.5% total iron. The calculated iron removal was therefore 99.0% and the titanium loss was about 1%. The $TiO_2$ product was readily adaptable for use as a white pigment.

Example IV

To 1000 parts of an ilmenite-magnetite ore having an analysis of 44.5% $TiO_2$, 39% FeO, and 4.5% $Fe_2O_3$ was added 3400 parts of 50% $H_2SO_4$ solution, 20 parts carbon, and 0.5 part oleic acid. This mixture was reacted with 20 parts gaseous $SO_2$ in an autoclave at a pressure of 2000 p. s. i. for a 30 minute period. The reacted mass was treated as in the previous examples and the dried $TiO_2$ residue analyzed 93.7% $TiO_2$ and 0.36% total iron. Iron removal was 99.5% and titanium solubilization was approximately 1%. Characteristically, the $TiO_2$ product was readily adaptable for use as white pigment.

By way of illustration and for comparative purposes, an ore of the type used in Example III was treated by a procedure similar to that described in Example III except that the organic flotation agent was omitted. The concentrate residue was found to contain 91.5% $TiO_2$ but was highly contaminated by the presence of 2.6% total iron. Thereby the iron removal was calculated to be only 95.2%. The resulting product was badly discolored, possessing a deep yellowish-brown color and was wholly unsatisfactory as a white pigment material.

It has been clearly shown by the description of the instant invention and by the examples presented that titanium dioxide pigment substantially free of iron may be prepared on a commercially practical basis by leaching a titaniferous iron material at high pressure (500–2000 p. s. i.) in the presence of small selected amounts of an organic flotation agent, reducing material and sulfuric acid of relatively low concentration. Furthermore, it is possible to treat titaniferous iron materials, in which the proportions of iron and titanium vary, in an economical and simple operation which insures the production of pigmentary grade titanium dioxide material. It has also been shown that the instant invention provides a simple and easy method for separating the iron content in a titaniferous iron material from the titanium content therein.

Although this invention has been described and illustrated by the examples shown, it is not intended to be strictly limited thereto and other modifications and variations may be employed within the limits of the following claims.

We claim:

1. Method for preparing a substantially iron-free titanium oxide material by reacting in a pressure vessel a mixture of titaniferous iron material containing ferric iron values, sulfuric acid, organic flotation agent, and reducing material which comprises the steps of: heating said mixture in said pressure vessel while maintaining the pressure within said pressure vessel in the range of from about 500 p. s. i. to about 2000 p. s. i. for a period of time sufficient to produce solubilized iron values in said mixture and directly convert the titanium values to substantially iron-free, relatively insoluble hydrated titanium dioxide, said reducing material being present in at least the theoretical amount required to reduce all of said ferric iron values to ferrous iron values, and said sulfuric acid being present in an amount sufficient to react with the ferrous iron values formed from said ferric iron and any additional ferrous iron values in said mixture, and thereafter separating said solubilized iron values from said insoluble, hydrated titanium dioxide.

2. Method for preparing a substantially iron-free titanium pigment material by reacting in a pressure vessel a mixture of titaniferous iron material containing ferric iron values, sulfuric acid, organic flotation agent, and reducing material which comprises the steps of: heating said mixture in said pressure vessel while maintaining the pressure within said pressure vessel in the range of from about 500 p. s. i. to about 2000 p. s. i. for a period of time sufficient to produce solubilized iron values in said mixture and directly convert the titanium values to substantially iron-free, relatively insoluble hydrated titanium dioxide, said reducing material being present in at least the theoretical amount required to reduce all of said ferric iron values to ferrous iron values, and said sulfuric acid being present in an amount sufficient to react with the ferrous iron values formed from said ferric iron and any additional ferrous iron values in said mixture, separating said solubilized iron values from said insoluble, hydrated titanium dioxide, and thereafter treating said hydrated titanium dioxide to produce a titanium dioxide pigment material.

3. Method for preparing a substantially iron-free titanium oxide material by reacting in a pressure vessel a mixture of titaniferous iron material containing ferric iron values, sulfuric acid, organic flotation agent, and reducing material which comprises the steps of: heating said mixture in said pressure vessel while maintaining the pressure within said vessel in the range of from about 500 p. s. i. to about 2000 p. s. i. for a period of time sufficient to produce solubilized iron values in said mixture and directly convert the titanium values to substantially iron-free, relatively insoluble hydrated titanium dioxide, said reducing material being present in at least the theoretical amount required to reduce all of said ferric iron values to ferrous iron values, the concentration of said sulfuric acid being from 20% to 50%, and the amount of said acid being substantially in excess of the amount required to react theoretically with all of the ferrous iron values formed from said ferric iron and any additional ferrous iron values in said mixture, said organic flotation agent being present in an amount from about 0.01% to about 0.1% on a weight basis of said titaniferous iron material, and thereafter separating the solubilized iron values from the insoluble, hydrated titanium dioxide values.

4. Method according to claim 3 wherein said reducing material comprises from about 2% to about 4% carbon and up to about 2% sulfur dioxide on a weight basis of the titaniferous iron material.

5. Method according to claim 3 wherein said flotation agent is oleic acid.

6. Method according to claim 3 wherein said flotation agent is nonanoic acid.

7. Method according to claim 3 wherein said flotation agent is fuel oil.

8. Method according to claim 3 wherein said flotation agent is terpineol.

References Cited in the file of this patent

UNITED STATES PATENTS 2,557,455   Moyer _____ June 19, 1951

OTHER REFERENCES

"Titanium," by Jelks Barksdale, 1949 Ed., pages 29, 30. The Ronald Press Co., New York.